(12) United States Patent
Maghraby

(10) Patent No.: US 8,112,494 B2
(45) Date of Patent: Feb. 7, 2012

(54) SYSTEMS AND METHODS FOR PROVISION OF CONTENT DATA

(75) Inventor: Adham Maghraby, Cairo (EG)

(73) Assignee: MediaWave International Corporation, Road Town, Tortola (VG)

( * ) Notice: Subject to any disclaimer, the term of this patent is extended or adjusted under 35 U.S.C. 154(b) by 357 days.

(21) Appl. No.: 12/191,228

(22) Filed: Aug. 13, 2008

(65) Prior Publication Data

US 2010/0042688 A1    Feb. 18, 2010

(51) Int. Cl.
*G06F 15/16* (2006.01)
(52) U.S. Cl. .................................... 709/217; 705/14.29
(58) Field of Classification Search .................. 709/201, 709/217; 705/14.29
See application file for complete search history.

(56) References Cited

U.S. PATENT DOCUMENTS

| | | | | |
|---|---|---|---|---|
| 4,787,063 A * | 11/1988 | Muguet | | 386/83 |
| 5,539,635 A | 7/1996 | Larson, Jr. | | |
| 6,507,727 B1 | 1/2003 | Henrick | | |
| 6,560,456 B1 | 5/2003 | Lohtia et al. | | |
| 6,628,928 B1 | 9/2003 | Crosby et al. | | |
| 6,901,364 B2 * | 5/2005 | Nguyen et al. | | 704/235 |
| 6,965,770 B2 | 11/2005 | Walsh et al. | | |
| 6,970,915 B1 | 11/2005 | Partovi et al. | | |
| 6,992,978 B1 * | 1/2006 | Humblet et al. | | 370/228 |
| 7,221,902 B2 | 5/2007 | Kopra et al. | | |
| 7,801,959 B1 * | 9/2010 | Lennie et al. | | 709/206 |
| 2001/0054059 A1 * | 12/2001 | Marks et al. | | 709/201 |
| 2002/0004812 A1 * | 1/2002 | Motoyama | | 709/201 |
| 2002/0090934 A1 | 7/2002 | Mitchelmore | | |
| 2003/0060157 A1 | 3/2003 | Henrick | | |
| 2004/0140989 A1 | 7/2004 | Papageorge | | |
| 2005/0049933 A1 | 3/2005 | Upendran et al. | | |
| 2005/0148296 A1 | 7/2005 | Kopra et al. | | |
| 2005/0154599 A1 | 7/2005 | Kopra et al. | | |
| 2005/0251454 A1 | 11/2005 | Wood | | |
| 2006/0059129 A1 * | 3/2006 | Azuma et al. | | 707/3 |
| 2006/0123053 A1 | 6/2006 | Scannell, Jr. | | |
| 2006/0165104 A1 | 7/2006 | Kaye | | |
| 2006/0276174 A1 | 12/2006 | Katz et al. | | |
| 2007/0141977 A1 | 6/2007 | O'Hanlon | | |
| 2007/0174199 A1 | 7/2007 | Stenberg et al. | | |
| 2007/0199027 A1 * | 8/2007 | Kwon | | 725/63 |
| 2008/0288639 A1 * | 11/2008 | Ruppert et al. | | 709/225 |

FOREIGN PATENT DOCUMENTS

EP    1401131 A2    3/2004

(Continued)

*Primary Examiner* — Asad M Nawaz
*Assistant Examiner* — Marie Georges Henry
(74) *Attorney, Agent, or Firm* — Venable LLP; Frank M. Gasparo

(57) ABSTRACT

A method for content data management and provision. The method includes receiving a registration message from a user, the registration message containing user identification information. The user may registered, the registering including storing the received user identification information. A blank message may be received, the blank message being addressed to a number associated with a broadcast entity. A user identity is determined based upon the received blank message, at least one of a date or a time of transmission of the blank message is determined, and a broadcast entity is determined based upon the blank message. The at least one determined date or time is compared with content broadcast information associated with the broadcast entity, and at least one piece of content data is identified based upon the comparing. The at least one piece of identified content data is transmitted to the user.

15 Claims, 3 Drawing Sheets

FOREIGN PATENT DOCUMENTS

| | | |
|---|---|---|
| GB | 2373608 A | 9/2002 |
| GB | 2380096 A | 3/2003 |
| WO | WO9817063 | 4/1998 |
| WO | WO0143364 | 6/2001 |
| WO | WO 2005/024741 | 3/2005 |
| WO | WO 2007/135677 | 11/2007 |

* cited by examiner

SYSTEMS AND METHODS FOR PROVISION OF CONTENT DATA

FIELD

The present application relates to systems and methods for provision of content data, and in particular to systems and methods for providing content data to users in response to messages sent by the users.

BACKGROUND

Users may desire to receive content data, including data such as music and audio data, film and video data, image data, text data, advertisement data, ringtone data, and the like.

Many systems exist for the provisioning of content data to users, such as recording of the content on transferable media, downloading of electronic content data from online vendors over data communication networks, streaming of content data over data communication networks, and the like. For instance, a user desiring to obtain a piece of content data may visit a conventional physical vendor location to purchase the content data on a recordable medium, or the user may utilize a virtual vendor location such as an online store through the use of a web browser software application and a communication network such as the Internet.

However, in each of the content data provisioning systems currently available, a user desiring to obtain content data must interact with a vendor or with a selection interface to identify the content data for provisioning. These processes require the user to be able to identify the content by name, artist, or the like, and require the user to maintain interest in obtaining the content and to actively pursue obtaining it by visiting a vendor or vendor website at some time after desiring the content. These elements require the user to wait for a period of time before obtaining desired content, and therefore reduce the probability of rapid and/or impulse sales opportunities.

Additionally, the user's interaction with the vendor or selection interface may prove cumbersome and unappealing to a user. For example, this interaction may require securing use of a computer with Internet access, navigation of complex graphical menus, searching for content on online databases, and progressing through online vendor websites. Further, in known content provisioning systems which provide content for purchase, the user must participate in a lengthy registration process to provide a vendor with identity and financial information. Each of these elements increase the effort required of the user, and accordingly lessen the probability for successful sales and provision of the content.

Accordingly, a need exists for methods and systems for enabling content provision without the need for interaction by the user with a content selection interface and without the need for the user to perform lengthy registration and information exchange processes with a content provider.

SUMMARY

An aspect of the present application provides for a method for content data management and provision, comprising receiving a registration message from a user, the registration message containing user identification information, registering the user, the registering including storing the received user identification information, receiving a blank message, the blank message being addressed to a number associated with a broadcast entity, determining a user identity based upon the received blank message and the stored user identification information, determining at least one of a date or a time of transmission of the blank message, determining a broadcast entity based upon the number to which the blank message is addressed, comparing the at least one determined date or time with content broadcast information associated with the broadcast entity, identifying at least one piece of content data based upon a result of the comparing, and transmitting the at least one piece of identified content data to the user.

A further aspect of the present application provides for a method for requesting and receiving content, comprising sending, by a user, a registration message to a content providing entity, the registration message containing user identification information, sending a blank message to the content providing entity, the blank message being addressed to a number associated with a broadcast entity, and receiving, by the user, at least one piece of content from the content providing entity in response to the blank message.

BRIEF DESCRIPTION OF THE DRAWINGS

Embodiments of the present application are illustrated by way of example in the accompanying figures, in which like reference numbers indicate similar elements, and in which.

DETAILED DESCRIPTION

Figure 1:
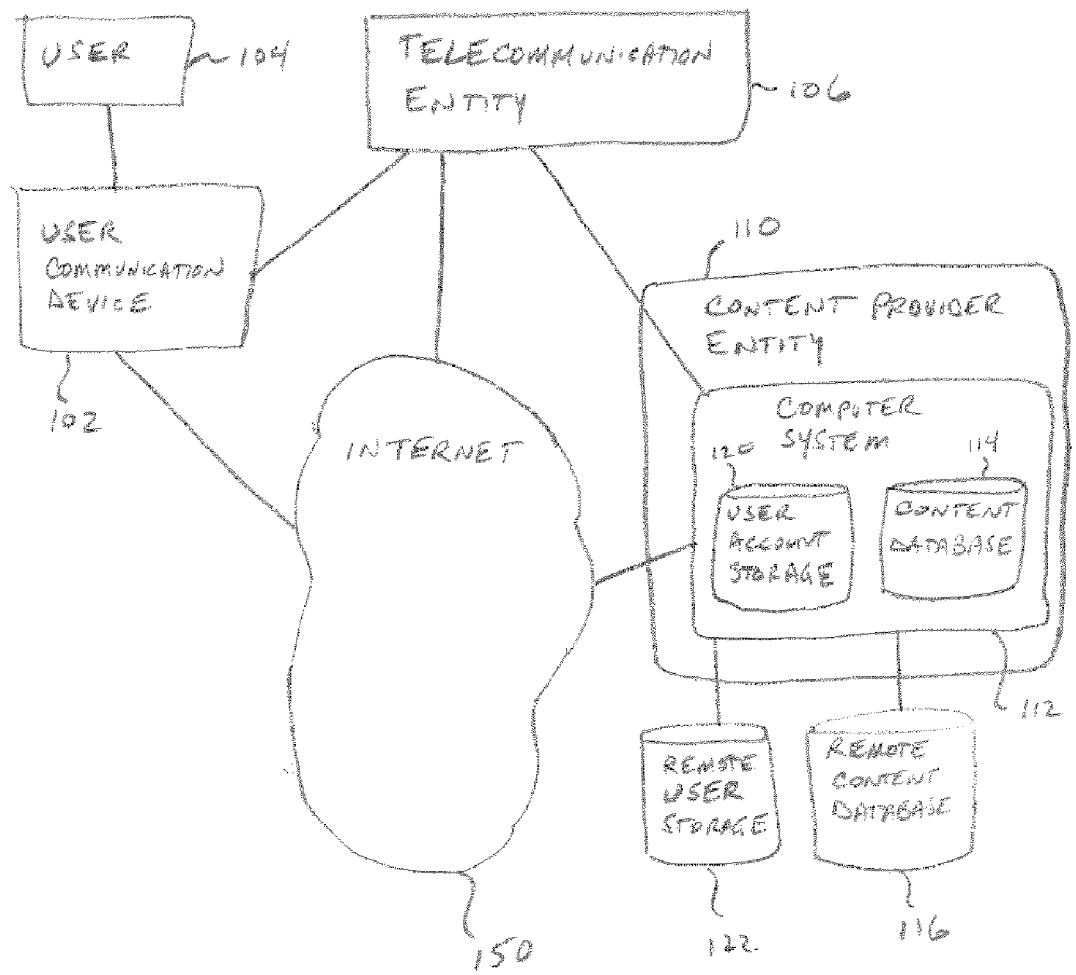
FIG. 1 shows an exemplary content data provisioning system according to an exemplary embodiment of the present application.

The exemplary embodiments of the present application relate to systems and methods for provisioning of content data to users.

In an exemplary embodiment the content data may include, for example, product specific data and/or service specific data including, but not limited to, music data, music information data, music lyric data, image data, motion picture data, television show data, product and/or service identification data, product and/or service advertisement data, product or service logo data, ringtone data, voice data, and/or any other suitable audio and/or visual data which may be provided to a user via a communication network.

A user may register with a content data providing entity. The registration may be performed through the transmission of a registration message to the providing entity, and the registration message may contain identification information. In an exemplary embodiment, for instance, the registration message may include a short message service ("SMS") message, and the identification information may include one or more of the following: a user electronic mail address, a user name, a user home address, a user telephone address, a user account number, and the like.

The registration message may be received by the content data provider entity, and in response, the user may be registered with the provider entity as a user and/or subscriber. In an exemplary embodiment, the registration of the user may be effective for the content provider entity that the user sent the registration message to, as well as for other content provider entities that are associated with and/or affiliated with the content provider entity. Accordingly, a single registration message may be effective to register the user with one or more of a plurality of content provider entities.

Registration of the user may include storage of the user identification information in one or more computers, databases, and the like. The user identification may be communicated to other content provider entities after registration at the content provider entity 110, or may be stored and provided to other content provision entities upon demand from the other content provider entities.

The user may request provision of content data by sending a content data request message to the content data provider entity 110. In an exemplary embodiment, the request message may include a SMS message, and the SMS request message may be blank. The SMS message may be addressed to a number or address that is associated with a broadcast channel, a broadcast entity, or any other suitable entity. Alternatively, the request message may include a message sent to or via an interactive voice response ("IVR") system, a voice response unit ("VRU") system, or the like.

The content data request message may be received by the content data provider entity. In an exemplary embodiment, in response to the receipt of the content data request message, at least one of a date or a time of transmission of the request message may be determined. The at least one determined date or time may be compared with content broadcast information associated with the broadcast channel. Based upon the comparison, at least one piece of content data may be determined, and the at least one piece of identified content data may be transmitted to the user.

The systems and methods introduced above will be described in greater detail below.

Referring to FIG. 1, a content data provisioning system 100 according to an exemplary embodiment is shown. The provisioning system 100 may include a user communication device 102. The user communication device 102 may include, for example, a personal computer, a handheld computer, a laptop, a media player, a personal digital assistant device, a telephone, a cellular phone, a television and/or video device, and the like. The user 104 may utilize the user communication device 102 to communicate with a telecommunication entity 106, and the telecommunication entity may include an entity that provides telephone, communication, networking, or other connectivity services to users, such as a telephone company, Internet service provider, or the like.

Alternatively, the user 104 may utilize the user communication device 102 to communicate with the a public data communication network 150. The public data communication network 150 may include the Internet.

Through the connection with the telecommunication entity 106 and/or the public communication network 150, the user 104 may communicate with a content provider entity 110. In an exemplary embodiment, the content provider entity 110 may include at least a content provider entity computer system 112 which is operable for storing content data to and/or retrieving content data from at least one of an internal content database 114 or a remote content database 116 that is located remotely from the content provider entity 110. Additionally, the content provider entity 110 may be associated with an internal user account database 120 and/or an external user account database 122 that is located remotely from the content provider entity 110.

The internal content database 114 and/or the remote content database 116 may include any of the types of content data information described above. Alternatively, the provisioning system 100 may include a plurality of internal content databases and/or remote content databases, whereby each database is operable for storing a single type of content data or different types of content data.

As will be understood by one skilled in the art, references in the present application to computer systems include software applications stored in and/or run by the computer systems, and the computer systems may be managed and/or administered by independent entities. Furthermore, references herein to individual entities should be understood to encompass and include the respective entity as well as agents of the respective entity and/or instruments controlled by the respective entity, such as computer systems, institutions, and the like. Additionally, the plural computer systems of the various exemplary embodiments may be located in geographically remote locations and linked via data communication networks, or may be integrated into one or more components or combinations of components located in close proximity. The various computer systems of the embodiments of the present application may include software modules stored in and/or run by computer systems, or may include separate, stand-alone computer components that are networked and/or interfaced with other computer systems.

As will be appreciated by one skilled in the art, the terms "computer," "computer system," and "network" as used herein may include a variety of combinations of fixed and/or portable computer hardware, software, peripherals, and storage devices. Generally each computer system identified herein may include at least a processor, random-access memory, a local or remote storage device, and peripherals such as keyboards, mice, printers, and monitors for enabling input and output of information to and from each computer system. Software routines and/or programs may be embedded and/or stored in the storage devices and run by the processors. Each network identified herein may include wired or wireless communication lines and associated conventional hardware devices used in transmitting, receiving, and routing data, such as routers, switches, hubs, interfaces, and the like.

The hardware and software components of the computer systems of the present application may include and may be included within fixed and portable devices including desktop, laptop, server, personal digital assistant, media player, telephone, smart phone, clock, watch, television, compact disc, digital video disc, radio, audio and video recording, replaying, download-capable, streaming, and any other suitable communication devices.

Storage devices of the exemplary systems of the present application may include devices for storing data electronically, such as hard drive devices, storage servers, storage-area networks, fibre channel storage networks, RAID configurations, optical media drives, holographic media drives, tape media drives, magnetic storage media, flash memory devices, and the like.

The processors of each of the plural computer systems may run software applications including operating systems such as UNIX, BSD, Linux, OS/2, VMS, console, and Microsoft applications, as well as database applications, networking applications, web server applications, file server applications, mail server applications, and the like.

The plural computer systems may also each be configured to function as a web server for delivering information via TCP/IP protocol and/or Internet interface. The information transmitted by the web server may include web page information identified by universal resource locators ("URLs"), and formatted in Hyper Text Markup Language ("HTML") or a similar formatting language in response to requests received via data communication networks. The web page information may also include information formatted using Dynamic HTML ("DHTML"), Extensible Markup Language ("XML"), Java, JavaScript, and the like. Alternatively, the web server may be configured to provide information utilizing Wireless Access Protocol ("WAP") to a WAP-enabled device such as a cellular telephone, personal digital assistant ("PDA"), and the like. Web server functions may be performed through utilization of web server applications such as Apache, Netscape, and Microsoft web server applications in conjunction with Common Gateway Interface ("CGI") applications. The CGI applications may perform tasks related to receiving and sending data packets to other computer systems via communication networks, and may additionally perform communication with the database applications in accordance with information received from the communication networks. The CGI applications may include programs written, for example, using programming languages such as C, C++, Java, Perl, Python, and shell scripts. Additionally, the web server applications may incorporate or may be associated with data encryption applications including Secure Socket Layer ("SSL") and/or Transport Layer Security ("TLS") applications for providing endpoint authentication and communications privacy using cryptography, and secure shell ("SSH") applications for encrypted communications, tunneling, forwarding ports, and transferring data files. The web server applications may additionally provide web services, and the web services may be provided via private communication networks and/or public communication networks such as the Internet.

The plural computer systems may additionally run database applications, and the database applications may be utilized to build and manage databases. The database applications may include relational database management systems, such as applications developed by Oracle, IBM, and the like.

Communication between the plural computer systems of the present application may be performed using wired or wireless communication lines, and may be performed using any suitable analog or digital communication protocol including TCP/IP, UDP, GSM, GPRS, EDGE, WAP, 3G/UMTS, CDMA, TDMA, SMS, and the like. Utilization of computer hardware and software components and performance of communication between the various components is well-known in the art, and will therefore not be described in greater detail herein.

Figure 2:
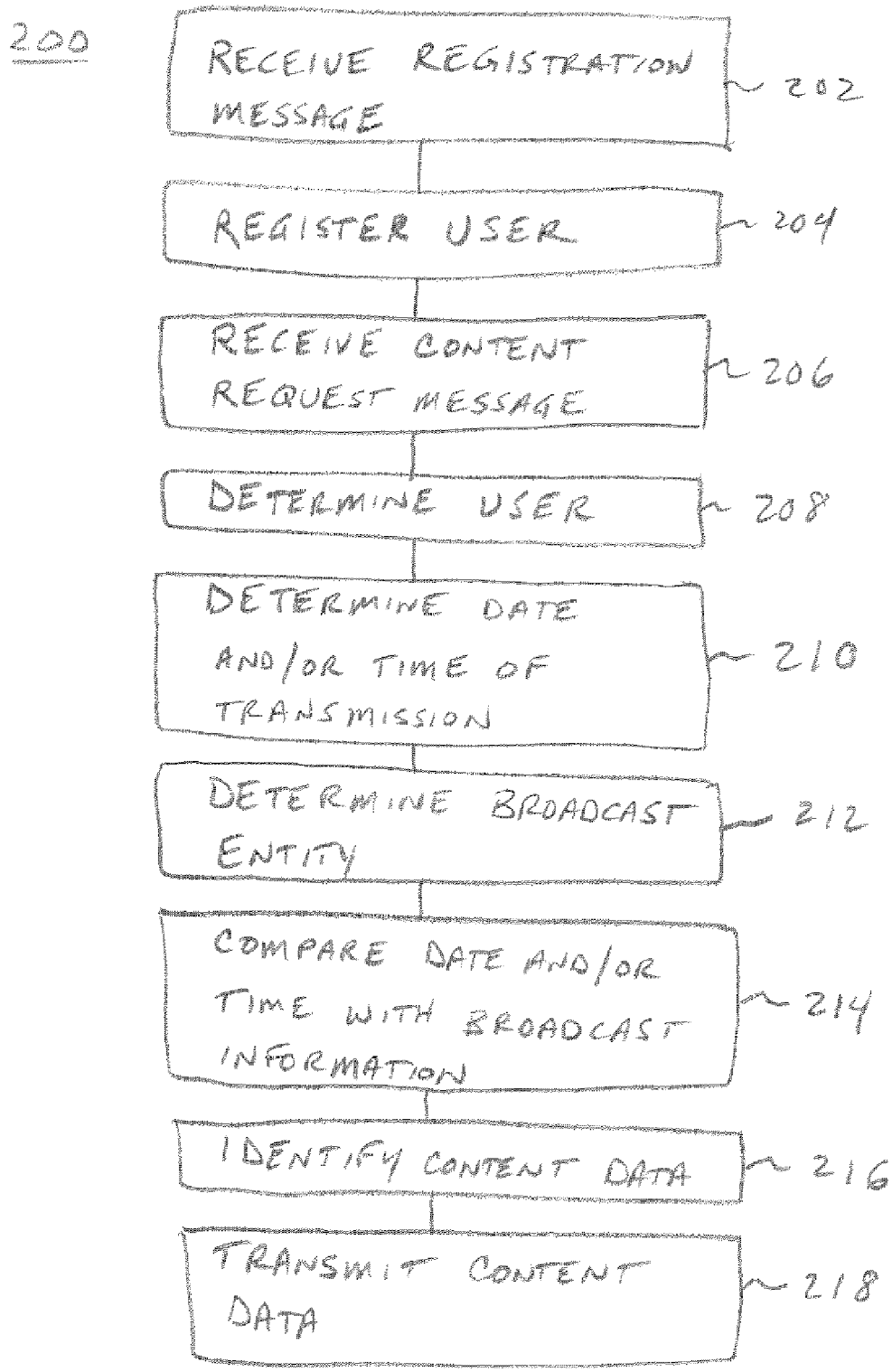
FIG. 2 is a flow diagram illustrating an exemplary method for content data provision according to an exemplary embodiment of the present application.

A method for content data management and/or provision is described with reference to FIG. 2. At step 202, a registration message may be received by the content provider entity 110 from a user. In an exemplary embodiment, the registration message may contain user identification information, such as one or more email addresses of the user, one or more home addresses of the user, a user name or nickname, a user password, one or more user telephone numbers, or any other suitable identification information. Any or all of these pieces of information may be included in the registration message, and any of the pieces of information may be combined with any other pieces of information. Alternatively, one or more of the pieces of identification information may be contained in the registration message, and the content provider entity 110 or an other entity may contact the user using the one or more pieces of identification information provided to ask the user to provide additional pieces of identification information.

In an exemplary embodiment, for instance, the registration message may be in the form of a SMS message sent from a telephone, smartphone, cellular telephone, personal digital assistant, or other portable communication device of the user. The identification information may be typed, dictated, or otherwise entered by the user, for instance, as text within a message body portion of the SMS message. Alternatively, the identification information may be attached to the registration message in machine-readable only formats, encrypted formats, binary formats, and the like. The registration message and/or the identification information enclosed therein or attached thereto may be sent in an unencrypted form, or may be encrypted using one or more encryption algorithms and decrypted upon receipt. Encryption and decryption of electronically-transmitted information is well-known to those skilled in the art, and are therefore not described in detail herein.

In alternative embodiments, the registration message may include a electronic mail message sent from a portable or non-portable computing and/or communication device, and the identification information may be included within the message as text information, or may be attached to the registration message in human-readable or machine-readable only formats.

In an exemplary embodiment, the registration message may be received by an SMS receiver web service that registers new users and/or that receives SMS requests from registered users. The SMS receiver web service may be operable to process either or both of registration request messages and content request messages, and may be operable to receive and analyze messages and determine whether received messages are registration request messages or content request messages based upon a result of the processing. The SMS receiver web service may also be operable for producing and transmitting messages to the user, for instance auto-reply confirmation messages indicating successful transmission and receipt of messages by the SMS receiver web service.

The registration message may alternatively be communicated to the content provider entity 110 by other suitable mechanisms, such as via an IVR and/or VRU system, for instance by interaction with the IVR and/or VRU system by the user through the use of a telephone or similar device. Alternatively, the user may communicate the registration message and/or identification information by sending such messages and information through an Internet webpage interface, or by communicating such messages and information to a human customer service representative of the content provider entity 110 by telephone or in person.

Once the registration message and/or the identification information has been received by the content provider entity 110, the user may be registered by the content provider entity 110 based upon the received user identification information, at step 204. In an exemplary embodiment, such registration may include, for example, creation of one or more accounts for the user, and association of the identification information of the user with the one or more accounts. The user account information may be stored along with other user account information in internal use account database 120 and/or in remote user account database 122, or in some other suitable location.

In addition to the identification information, information associated with the device used to send the registration message may additionally be associated with the user's account. In an exemplary embodiment, for example, a telephone number, a SMS number, serial number, computer Internet protocol ("IP") address, domain name, or other address of the device used by the user to send the registration message may be read, stored, and associated with the user's account.

In an alternative exemplary embodiment, the identification information may include financial information of the user, such as credit card account number information of the user, checking account or debit account number information of the user, and the like. Such financial information may be used to bill the user for content data transmitted to the user.

In an exemplary embodiment, a registration notice message may be transmitted to the user by the content provider entity 110 in response to the registration of the user. The registration notice message may include, for instance, an email message, a letter sent by postal mail, a SMS message, a telephone or live voice message, or any other suitable message operable to serve as notice that the user has been successfully registered.

In an exemplary embodiment, the registration notice message may contain content and/or content provider entity identification information, such as information about the content provider entity 110, content provided by the content provider entity 110, and affiliates of the content provider entity 110. Alternatively, the content and/or the content provider entity information may be included in notice messages sent to the user by the content provider entity 110 or affiliates of the content provider entity 110.

For example, the content provider entity 110 may be affiliated with other content provider entities, each of which may register the user through the registration message, as described above. Accordingly, upon registration, the user may request content from any one or more of these affiliated content provider entities through the content request methods described below.

Any or all of these affiliated content provider entities may send the user one or more notice messages identifying the respective content provider entity, content provided by the respective content provider entity, additions or deletions from the content data provided, instructions, news, updates, service changes, new affiliate content provider entity additions or deletions, pricing information, and the like. The notice messages may include messages in email, postal mail, voice, SMS, or any other suitable communication format. The notice messages may also identify one or more broadcast entity name, broadcast entity location, station type, content type, broadcast entity contact number, content genre, content artists, broadcast entity address, or the like. The notice messages may be sent to the user periodically at any suitable frequency, or may be sent upon request from the user, for example via a request received via email, telephone, SMS, postal mail, or other suitable request format.

After registration, the user may transmit a content request message to the content provider entity 110. In an exemplary embodiment, the content request message may include a blank message. Further, in an exemplary embodiment, the content request message may include a SMS message.

For instance, the content request message may include a SMS message having a blank text field, whereby the user does not enter, attach, or otherwise associate any information in information fields or areas of the SMS message.

In an alternative exemplary embodiment, the content request message may include information, such as personal identification number ("PIN"), password, passcode, or other relevant data. Alternatively, the content request message may include an address of another user that the user may wish to send content to, as described below.

Alternatively, the content request message may include a short code or other suitable identifier, for instance, a code that identifies a particular piece of content data, as described below.

In an exemplary embodiment, the content request message may be addressed to a number that is associated with a broadcast entity. Alternatively, the content request message may be addressed to a code and/or other suitable addressing information that is associated with a broadcast entity. For instance, when the content request message is a SMS message, the SMS content request message may be addressed to an SMS address number that is associated with a predetermined broadcast channel and/or broadcast entity. For example, the SMS message may be addressed to a number that is associated with a particular broadcast station channel, a broadcast station name, a terrestrial radio station name or frequency, satellite radio station name or frequency, a television station, an Internet website name or address, an Internet radio station name or address, and the like. Alternatively, the SMS content request message may be addressed to a number that is associated with a entity such as a corporation, an advertisement, a product, a brand, a location, a performer, a computer network address, a magazine, a product manufacturer, or a product name.

In an exemplary embodiment, a terrestrial, satellite, or Internet radio station may have a number associated with it, for instance, a SMS number. Accordingly, the content request message sent by the user may be addressed to that associated number. In this way, the content request message sent by the user may be associated with the particular radio station that is associated with the number the user chose to address the content request message to. The radio station described with respect to this embodiment is exemplary only, and it should be understood that a number may be associated with any of the broadcast or other entities described above in a similar manner.

The content provider entity 110 may create, maintain, revise, update, and store a plurality of such numbers, and may correlate the numbers with the associated entities. These stored numbers may be updated by the content provider entity 110, or may be updated by the entities through contact with the content provider entity 110.

Each of these numbers may be maintained by the content provider entity 110, and may be assigned to each of the broadcast entities. Messages sent to address numbers and/or codes associated with the broadcast entities may be received by the content provider entity 110, or may be received and/or processed by an entity that is independent from the content provider entity 110, whereupon either the message or information associated with the message may thereafter be transmitted to the content provider entity 110.

Alternatively, when the content request message is transmitted via an IVR, VRU, website, or customer support representative, a number and/or code that is associated with the broadcast entity may be entered and/or provided by the user, for example by providing the number and/or code orally, or by using a keypad, keyboard, or other suitable input device.

Upon receipt of the content request message, an identity of the user may be determined at step 208. In an exemplary embodiment, the identity of the user may be identified by reading an origination address of a device used to transmit the content request message received at step 206, and comparing the origination address with the user account information stored by the content provider entity 110. In an exemplary embodiment, for instance, an SMS number of a telephone or portable computer device that was used by the user to transmit the content request message may be read and compared against all user account records using standard computing algorithms, to identify the sender of the content request message. Upon determination of the user's identity, the user's identification information may be easily obtained by reference to the user's account information, including the user's electronic mail account information, and the like.

In an exemplary embodiment, the content request message may include, for instance, a SMS message addressed to an address number and/or code associated with the broadcast entity. The SMS message may be blank, and may accordingly contain no additional information provided by the user aside from the address numbers and/or codes associated with the broadcast entity, as describe above. The blank SMS content request message may accordingly be sufficient to allow the provision of desired content data to the user. Alternatively, the content request message may contain additional information, and the additional information may be content specific. The additional information may be utilized, stored, or processed by the content provider entity 110, or may be discarded.

At least one of a date or a time of transmission of the content request message may be determined, at step 210. The determining of step 210 may be performed by reading and/or otherwise sensing timestamp and/or date information attached to the content message at transmission by a device of the user, timestamp and/or date information attached to the content message at a time of receipt by a device of the content provider entity 110, network transmission and/or protocol time and/or date information, or other suitable transmission information of the content request message.

Additionally, at step 212, a broadcast entity may be determined based upon the address to which the content request message is addressed. In an exemplary embodiment, for instance, an SMS number to which the content request message is addressed may be read, and the read SMS number may be compared with stored information of broadcast entities and associated numbers and/or codes. In this way, the content provider entity 110 may determine a broadcast entity with which the SMS content request message was associated by the user.

After receipt of the content request message and determining of the date and/or time information and broadcast entity of the content request message, the determined date or time information is compared with content broadcast information associated with the broadcast entity, at step 214.

The content broadcast information may relate to content data that are broadcast, published, or otherwise transmitted by the broadcast entity. The content broadcast information may include log file information that lists the content that is, was, or that is scheduled to be broadcast by the respective broadcast entity, along with corresponding broadcast date and time information. The content log file information may include, for instance, content identification information, content broadcast channel identification information, content broadcast time information, and/or content broadcast date information. The content broadcast log file information may be compiled, organized, or otherwise maintained by each respective broadcast entity, and transmitted to the content provider entity 110. Such compilation and transmission of the content broadcast log file information may be performed on a periodic basis, such as at predetermined time intervals, or may be performed upon request by the content provider entity 110.

For example, when the broadcast entity is a terrestrial, satellite, or Internet radio station, the content broadcast information may include playlists and/or listings of songs and other content items that are broadcast by the radio station, along with times and dates of broadcast of each content item, and any other relevant information relating to identification of content that is broadcast by the radio station.

The content broadcast information may also include other information associated with broadcast content. In an exemplary embodiment, for instance, such other information may include artist identification information, album identification information, content type information, content release date information, content location information, content title information, content director and/or cast information, content language information, and the like.

In an alternative exemplary embodiment, the content broadcast information may include identification of print, text, image, or other content published in a print format. For instance, the content request message may include a short code or other suitable identifier, as described above, and the short code or other identifier may identify particular content. Such a code or identifier may be utilized when a content broadcast time is very long and/or uncertain, as may be the case in a print or periodical publication.

In an exemplary embodiment, the content broadcast information may be retrieved from the determined broadcast entity by the content provider entity 110 at a time of determining of the broadcast entity at step 212. Alternatively, content broadcast information of one or more broadcast entities may be received on a singular or periodic basis, for example at regular time intervals, and stored by the content provider entity 110.

Based upon the determining and/or comparing described above, at least one piece of content data may be identified, at step 216. The at least one piece of content data may include any type of content data as described above, and may include one or more than one piece of content data.

Upon identification of the at least one piece of content data, the at least one piece of identified content data may be transmitted to the user, at step 218. The transmission of the at least one piece of content data may be performed via any suitable network communication mechanism, including via a computer data communication network such as the Internet, via a wireless data communication network, via a local area network or wide area network, via electronic mail, via SMS, and the like. The at least one piece of content data may be transmitted to an email address of the user, to a cellular telephone of the user, to a personal digital assistant or portable computer device of the user, and/or to a streaming media software application run by the user.

Alternatively, the content data may be encoded and/or recorded to a recordable medium, such as a CD, DVD, Blu-Ray Disk, HD-DVD, magnetic tape, flash memory, or the like, and transmitted via postal mail or in person at a location of the user or at another suitable location.

In an exemplary embodiment, for example, the at least one piece of identified content data may be transmitted to an electronic mail address of the user, such as an electronic mail address that was obtained via the registration message received at step 202.

In an exemplary embodiment, the at least one piece of content data may be transmitted to the user in more than one format, and may be transmitted to more than one address of the user through any suitable combination of delivery mechanisms. For instance, the content data may be transmitted to one or more electronic mail addresses of the user, and may also be delivered to a cellular telephone and/or mobile communication device of the user. In an alternative exemplary embodiment, the content data may be transmitted to the user in one or more formats or using one or more delivery mechanisms, and a message may thereafter be sent to the user inviting the user to request delivery of the content data in another format or via another delivery mechanism. For instance, the requested content data may be transmitted to an electronic mail address of the user, and the transmitted content data may be accompanied or followed by an electronic message inviting the user to request transmission of the same content data to a cellular telephone and/or mobile communication device of the user. Such request may be performed by the user replying to the electronic mail message, by sending another message that contains an identifier and/or code that is included in the message inviting the user to request additional transmission, by sending a message that identifies the transmitted content by date and/or time of transmission, by interaction with a customer service representative or VRU, or by any other suitable request mechanism as described above.

In an exemplary embodiment, a message may be sent to the user after transmission of requested content, and the message may invite the user to request transmission of one or more pieces of content data that are related to the requested content data. For example, following transmission of content data relating to a song, a message may be sent to the user inviting the user to request transmission of lyric data, video data, or album and/or compilation of song data that that includes the transmitted song data. Alternatively, the message may identify lyric data, song data, video data, and the like that are related to the transmitted song data, such as content data of the same performer, music genre, music type, age, and the like.

In an alternative exemplary embodiment, in substitution of or in addition to the transmission of the at least one piece of content data as described above, a content link that is associated with the at least one piece of content data may be transmitted to the user. For instance, the content link may include a communication network address of a computer which stores the at least one piece of content data. The content link may therefore be operable to allow downloading of the at least one piece of content data by the user. The content link may additionally be transmitted with authentication information such as a password, or may be accompanied by instructions to the user or other information necessary to facilitate downloading of the at least one piece of content data.

In an exemplary embodiment, the content link may be transmitted to a different address and/or through a different communication mechanism that the transmission of the at least one piece of content data. For instance, the content link may be transmitted to a first email address of the user, and the at least one piece of content data may be transmitted to a second email address of the user, or to a different location of the user.

In an exemplary embodiment, the content link and/or the piece of content data may be sent to another individual in substitution for or in addition to the user. The identity of the other individual or an address of the other individual may be provided, for example, in the content request message received at step 206.

The method described above may be performed at any time relative to the broadcast and/or publication of the content data by the broadcast entities, including in real time, as the content data are being broadcast.

In an exemplary embodiment, therefore, the user may transmit a registration message to the content provider entity 110, and be registered with the content provider entity 110. Thereafter, the user may request that content data be transmitted simply by transmitting a content request message. For instance, the user may be listening to or watching a particular broadcast entity such as a radio or television station, and desire to obtain the content that is being broadcast at that moment, such as a song or a television show. The may send a content request message such as a blank SMS message, addressed to a address that is associated with the particular radio or television station. The broadcast entity address may be information that is announced by the content provider entity 110 and/or by the radio or television station. By addressing the content request message to the radio or television station address number, the content provider entity 110 may receive it, and may associate the request with the corresponding broadcast entity. Further, the content provider entity 110 may obtain an origination address from the content request message, such as an SMS number of the device used to send the message, and determine the identity of the user by comparing the origination address with its user accounts records. Further, the content provider entity 110 may determine a date and/or time of the content request message from the message itself. Using the determined date and/or time, along with the broadcast entity identity, the content provider entity 110 may determine what content data was being broadcast when the user transmitted the content request message, and may thereafter transmit that content to the user, by email or by other suitable transmission mechanism.

Additionally, branding information may be attached to or otherwise associated with the at least one piece of content data prior to transmission of the content data to the user. In an exemplary embodiment, for instance, a logo, image, advertisement, contact information, addresses, a personalized message, or other branding information or marketing indicia may be associated with the content data. For example, an audible advertisement may be attached to audio content data, a video advertisement or logo may be attached to video content data, or a logo or text advertisement may be attached to graphical or text content data. The content data may additionally be modified such that it appears to originate with an entity other than the content provider entity 110, such as a product manufacturer or content creator or publisher.

Additionally, billing information associated with the at least one piece of identified and/or transmitted content data may be transmitted to an entity that provides message, network, or other communication service to the user. In an exemplary embodiment, for instance, billing information associated with a cost of the at least one piece of content data may be sent to an entity that provides SMS message service to the user. Such an entity may thereafter relay the billing information to the user. The entity that provides the message service to the user may transmit a payment corresponding to the billing information to the content provider entity 110, and may thereafter request reimbursement for such payment from the user through an independent transaction.

Figure 3:
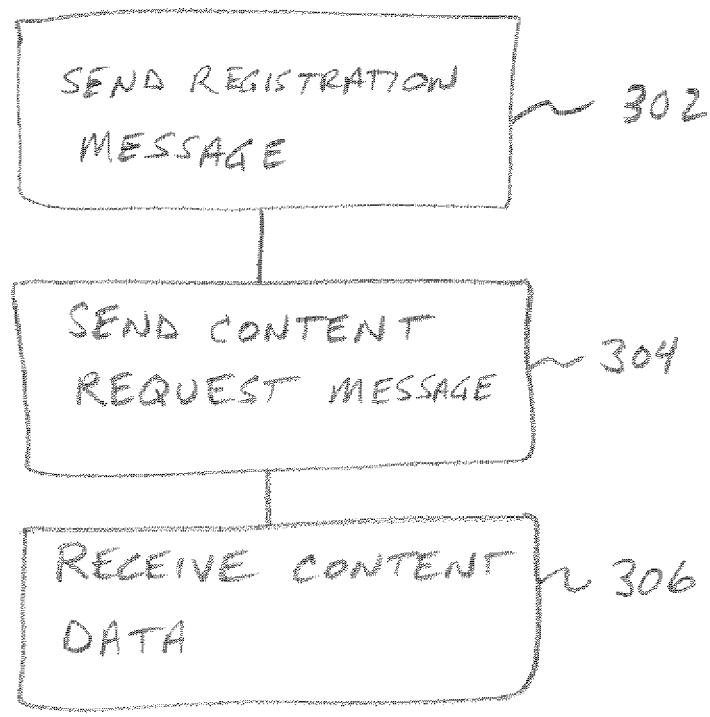
FIG. 3 is a flow diagram illustrating a method for requesting and receiving content data according to an exemplary embodiment of the present application

Referring to FIG. 3, an exemplary embodiment of a method for requesting and receiving content may include sending a registration message to a content providing entity, the registration message containing user identification information, at step 302. A blank message may be sent to the content providing entity, at step 304. The blank message may be addressed to a number associated with a broadcast entity. At least one piece of content data may be received from the content providing entity in response to the blank message, at step 306.

In an alternative exemplary embodiment, the user may receive a machine-readable link, and the link may be operable for downloading of the at least one piece of content. The link may be operable for directing the user to a website, Internet address, or the like, where the user may download the content, for instance through a web interface. Alternatively, the user may be directed to a vendor web site where the requested content or other content may be purchased, for instance in a downloadable format or in a physical media format that may be delivered to the user. Alternatively, the user may be directed to a location such as a website that allows the user to access a streaming feed of the requested and/or other content for playback. The playback may be performed, for instance, on a mobile communication device of the user, a personal computer device, and/or on any other suitable device. Additionally, the user may receive billing information associated with the at least one piece of content from an entity that provides SMS service to the user.

In alternative exemplary embodiments, the methods and systems as described above may be utilized in association with one or more content modules, and the one or more content modules may include modules associated with different types of content data. For instance, the one or more modules may include a radio module, a television module, and/or a GSM/VAS provider module.

A radio module, for instance, may allow users listening to a radio broadcast entity to send a registration message including identification information, such as an email address, to the content provider entity 110, as described above. The registration message may include, for instance, a SMS message, as described above. The user may be registered by the content provider entity 110 after receipt of the registration message, and the user may thereafter be able to request content broadcast by the radio broadcast entity using the request mechanisms described above. The requested content may be transmitted to the user through any one or combination of suitable delivery mechanisms, and may for instance be transmitted to one or both of an electronic mail address of the user and to a mobile communication device of the user. The content may additionally be transmitted to the user in other ways, such as to a computing device of the user, a video device of the user, and the like.

In the television module, a user watching a television and/or other video content broadcasting entity may send a registration message to the content provider entity 110, as described above. The registration message may include, for instance, a SMS message, as described above. The user may be registered by the content provider entity 110 after receipt of the registration message, and the user may thereafter be able to request content broadcast by the television and/or other video broadcast entity using the request mechanisms described above. The requested content may be transmitted to the user through any one or combination of suitable delivery mechanisms, and may for instance be transmitted to one or both of an electronic mail address of the user and to a mobile communication device of the user. The content may additionally be transmitted to the user in other ways, such as to a computing device of the user, a video device of the user, and the like.

In the GSM/VAS provider module, a user may request ringtone and/or ring back tone content data. The user may send a registration message to the content provider entity 110, as described above. The registration message may include, for instance, a SMS message, as described above. The user may be registered by the content provider entity 110 after receipt of the registration message. Through the GSM/VAS provider module, the user may request ringtone content and/or ring back tone content broadcast and/or transmitted by GSM operator portals and/or independent portals offering ringtone content and/or ring back tone content. The ringtone content and/or ring back tone content may be provided by the content provider entity 110 as described above. The requested content may be transmitted to the user through any one or combination of suitable delivery mechanisms, and may for instance be transmitted to one or both of an electronic mail address of the user and to a mobile communication device of the user. The content may additionally be transmitted to the user in other ways, such as to a computing device of the user, a video device of the user, and the like. After the requested content is transmitted to the user, one or more additional messages may be sent to the user inviting the user to request transmission of full track, video, compilation, lyrics, image, or any other suitable type of content data that is associated with the requested ringtone content and/or ring back tone content. The one or more messages may be in any suitable format, for example in SMS or electronic mail format. For example, a user may request transmission of a ringtone content; after transmission of the requested ringtone content to the user, one or more SMS messages may be sent to the user inviting the user to request transmission of a song, album, video, lyric, and the like, that is associated with the transmitted ringtone content.

Any of the transmitted content, for example the content transmitted to the user and/or the content downloaded by the user by following a link transmitted to the user, may include digital rights management ("DRM") features. Such DRM features may include code embedded in the content, a file or other information accompanying or associated with the content, or any other suitable DRM mechanism. Such DRM features may be operable to restrict the player or communication device that may be used to view, hear, store, or transmit the content, may be operable to restrict how often the content may be played, or may be operable to restrict who may play the content, when, and for how long.

As will be understood by one skilled in the art, the present application is not limited to the precise exemplary embodiments described herein and that various changes and modifications may be effected without departing from the spirit or scope of the application. For example, elements and/or features of different illustrative embodiments may be combined with each other, substituted for each other, and/or expanded upon within the scope of the present disclosure and the appended claims. In addition, improvements and modifications which become apparent to persons of ordinary skill in the art after reading the present disclosure, the drawings, and the appended claims are deemed within the spirit and scope of the present application.

What is claimed is:

1. A computer-based method for content data management and provision, the computer-based method being performed by a computer system comprising one or more computers, the method comprising:

receiving, by the computer system, a registration message from a user, the registration message containing user identification information;

registering, by the computer system, the user, the registering including storing the received user identification information in a database;

receiving, by the computer system, a blank message from the user, the blank message being addressed to a number associated with a broadcast entity;

determining, by the computer system, an identity of the user based upon the received blank message and the stored user identification information;

determining, by the computer system, at least one of a date or a time of transmission of the blank message;

determining, by the computer system, the broadcast entity based upon the number to which the blank message is addressed;

comparing, by the computer system, the at least one determined date or time of transmission of the blank message with content broadcast information associated with the broadcast entity, wherein the content broadcast information includes log file information compiled by the broadcast entity;

identifying, by the computer system, at least one piece of content data from the content broadcast information based upon a result of the comparing, wherein the at least one piece of identified content data includes at least one of audio data, image data, video data, ringtone data, text data, or voice recording data; and transmitting, by the computer system, the at least one piece of identified content data to the user.

2. The method of claim 1, further comprising transmitting, by the computer system, a machine-readable link to the user, the link including a network address operable for downloading the at least one piece of identified content.

3. The method of claim 1, further comprising transmitting, by the computer system, billing information associated with the at least one piece of identified content to an entity that provides communication service to the user.

4. The method of claim 1, further comprising receiving, by the computer system, the content broadcast information from the broadcast entity.

5. The method of claim 1, further comprising retrieving, by the computer system, the content broadcast information from the broadcast entity.

6. The method of claim 1, further comprising transmitting, by the computer system, a confirmation message to the user, the confirmation message confirming registration of the user.

7. The method of claim 1, further comprising attaching, by the computer system, a branding element to the at least one piece of identified content prior to transmitting the at least one piece of identified content to the user.

8. The method of claim 7, wherein
the branding element includes at least one of a logo, an advertisement, an address, contact information, marketing indicia, or a personalized message.

9. The method of claim 1, wherein
at least one of the registration message or the blank message is a short messaging system ("SMS") message.

10. The method of claim 1, wherein
the user identification information includes at least one of an email address of the user, a home address of the user, a name of the user, or a telephone number of the user; and
identifying the user includes comparing origination information associated with the blank message with the stored user identification information.

11. The method of claim 1, wherein
the broadcast entity includes at least one of a terrestrial radio station, a satellite radio station, an Internet radio station, an Internet website, a television station, a print publication publisher, or a computer.

12. The method of claim 1, wherein
the number associated with a broadcast entity includes a number associated with a broadcast station channel, a broadcast station name, a terrestrial radio station name, a terrestrial radio station frequency, a satellite radio station name, a satellite radio station frequency, a television station name, an Internet website name, an Internet website address, an Internet website name, an Internet radio station address, an Internet radio station name, or a publisher name.

13. The method of claim 1, wherein
the number associated with a broadcast entity includes a number associated with a corporation, an advertisement, a product, a brand, a location, a performer, a magazine, a product manufacturer, or a product name.

14. The method of claim 1, wherein the log file information contains at least one of content identification information, content broadcast channel identification information, content broadcast time information, or content broadcast date information.

15. The method of claim 1, wherein
transmitting the at least one piece of content includes transmitting the content to an email address of the user, a cellular telephone of the user, a streaming media application of the user, or a personal digital assistant of the user.

* * * * *